United States Patent [19]

Mori

[11] 4,454,546
[45] Jun. 12, 1984

[54] BAND COMPRESSION DEVICE FOR SHADED IMAGE

[75] Inventor: Sumio Mori, Saitama, Japan

[73] Assignee: Fuji Photo Film Co., Ltd., Minami-ashigara, Japan

[21] Appl. No.: 242,209

[22] Filed: Mar. 10, 1981

[30] Foreign Application Priority Data

Mar. 13, 1980 [JP] Japan .................................. 55-32082

[51] Int. Cl.³ .......................... H04N 7/13; H04N 1/00
[52] U.S. Cl. .................................... 358/260; 358/133; 382/56
[58] Field of Search ...................... 358/133, 260, 261; 382/56

[56] References Cited

U.S. PATENT DOCUMENTS

| | | | |
|---|---|---|---|
| 4,133,006 | 1/1979 | Iinuma | 358/133 |
| 4,173,771 | 11/1979 | Iijima | 358/260 X |
| 4,200,886 | 4/1980 | Musmann et al. | 358/260 X |
| 4,222,076 | 9/1980 | Knowlton | 358/260 |
| 4,288,816 | 9/1981 | Kashioka et al. | 382/56 |
| 4,316,222 | 2/1982 | Subramaniam | 358/261 |
| 4,355,337 | 10/1982 | Sekigawa | 358/260 |
| 4,365,273 | 12/1982 | Yamada et al. | 358/260 |

OTHER PUBLICATIONS

Kobayashi et al.: Image Data Compression by Predictive Coding, IBM Journal Research and Development, Mar. 1974, pp. 164–171.

Primary Examiner—Felix D. Gruber
Attorney, Agent, or Firm—Sughrue, Mion, Zinn, Macpeak & Seas

[57] ABSTRACT

A band compression method for a shaded image in which a sample input picture element value and an estimation error obtained from an estimation value of the input picture element are converted into quantization values and coded. First codes are temporarily stored in at least one block of buffer memories according to a quantization step number. The estimation errors are converted into quantization values corresponding to the input picture element values. Each quantization value is converted into the first code when the estimation error is quantized corresponding to the estimation error and quantization value. The next picture element value is estimated in accordance with the quantization value.

6 Claims, 16 Drawing Figures

PRIOR ART
FIG. 1
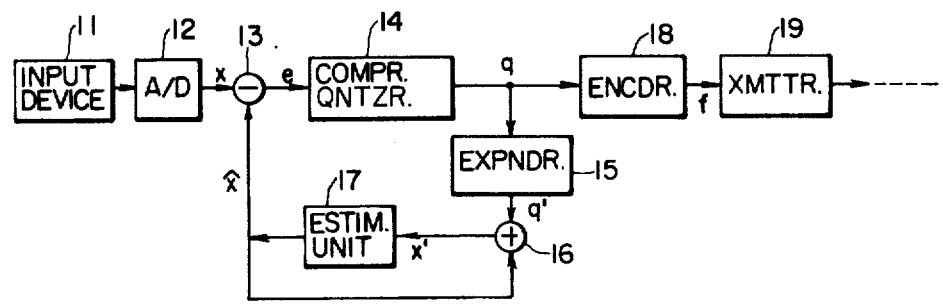
PRIOR ART
FIG. 2
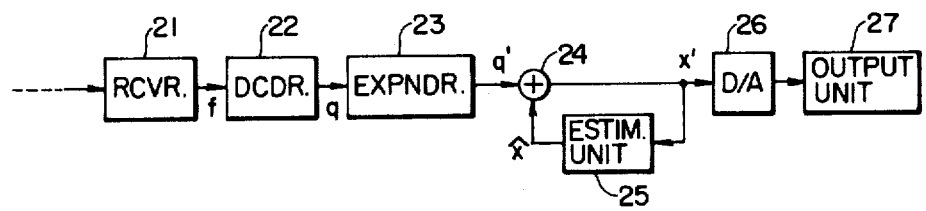
FIG. 3A    FIG. 3B    FIG. 3C
| STEP NO. | ESTIMATION ERROR e | QUANTIZATION VALUE q |
|---|---|---|
| 4 | 10~ | 13 |
| 3 | 5~9 | 7 |
| 2 | 2~4 | 3 |
| 1 | 0~1 | 0 |
| 1 | -1~-2 | -1 |
| 2 | -3~-5 | -4 |
| 3 | -6~-10 | -8 |
| 4 | -11~ | -14 |
| QUANTIZATION CODE | |
|---|---|
| CODE f | BIT STATE |
| 9 | 1 0 0 1 |
| 10 | 1 0 1 0 |
| 12 | 1 1 0 0 |
| 8 | 1 0 0 0 |
| 0 | 0 0 0 0 |
| 4 | 0 1 0 0 |
| 2 | 0 0 1 0 |
| 1 | 0 0 0 1 |
| | 1 2 3 4 |
| | BIT POSITION |
| QUANTIZATION CODE | |
|---|---|
| CODE f | BIT STATE |
| 7 | 1 1 1 |
| 5 | 1 0 1 |
| 6 | 1 1 0 |
| 4 | 1 0 0 |
| 0 | 0 0 0 |
| 2 | 0 1 0 |
| 1 | 0 0 1 |
| 3 | 0 1 1 |
| | 1 2 3 |
| | BIT POSITION |

FIG. 4A

| ESTIMATION ERROR (POSITIVE) | QUANTIZATION VALUE | ESTIMATION ERROR OCCURRENCE PROBABILITY | ESTIMATION ERROR (NEGATIVE) | QUANTIZATION VALUE | ESTIMATION ERROR OCCURRENCE PROBABILITY | TOTAL |
|---|---|---|---|---|---|---|
| 0~1 | 0 | 79.59 | -1~-2 | -1 | 9.34 | 88.93 |
| 2~4 | 3 | 8.11 | -3~-5 | -4 | 1.84 | 9.95 |
| 5~9 | 7 | 0.53 | -6~-10 | -8 | 0.41 | 0.94 |
| 10~ | 13 | 0.09 | -11~ | -14 | 0.09 | 0.18 |
| TOTAL | | 88.32 | TOTAL | | 11.68 | 100.00 |

FIG. 4B

| ESTIMATION ERROR | QUANTIZATION VALUE | ENTROPY CODE EXAMPLE(1) | EXAMPLE(2) |
|---|---|---|---|
| 10~ | 13 | 000010 | 00010 |
| 5~9 | 7 | 00010 | 0010 |
| 2~4 | 3 | 001 | 010 |
| 0~1 | 0 | 01 | 1 |
| -1~-2 | -1 | 0001 | 011 |
| -3~-5 | -4 | 000011 | 00011 |
| -6~-10 | -8 | 0000001 | 00001 |
| -11~ | -14 | 0000001 | 00001 |

FIG. 4C

| BIT POSITION | OCCURRENCE PROBABILITY OF STATES "0" and "1" STATE 1 | STATE 0 | ENTROPY |
|---|---|---|---|
| 1 | 88.32 | 11.68 | 0.52 |
| 2 | 9.95 | 90.05 | 0.46 |
| 3 | 0.94 | 99.06 | 0.07 |
| 4 | 0.18 | 99.82 | 0.02 |
| TOTAL | | | 1.07 |

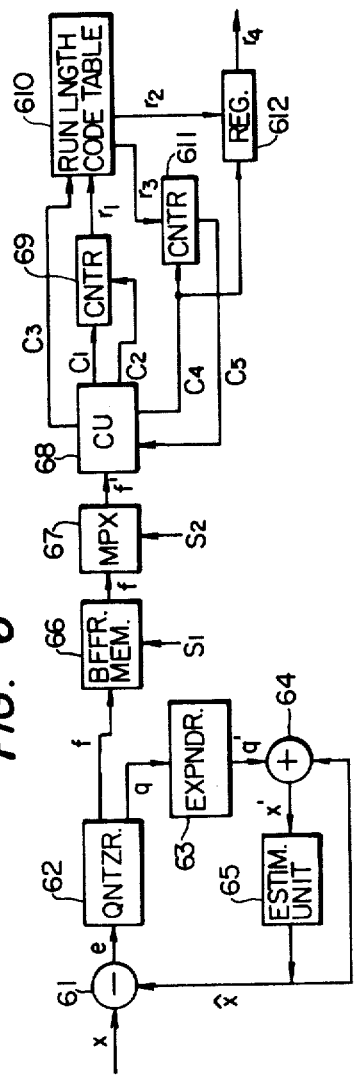
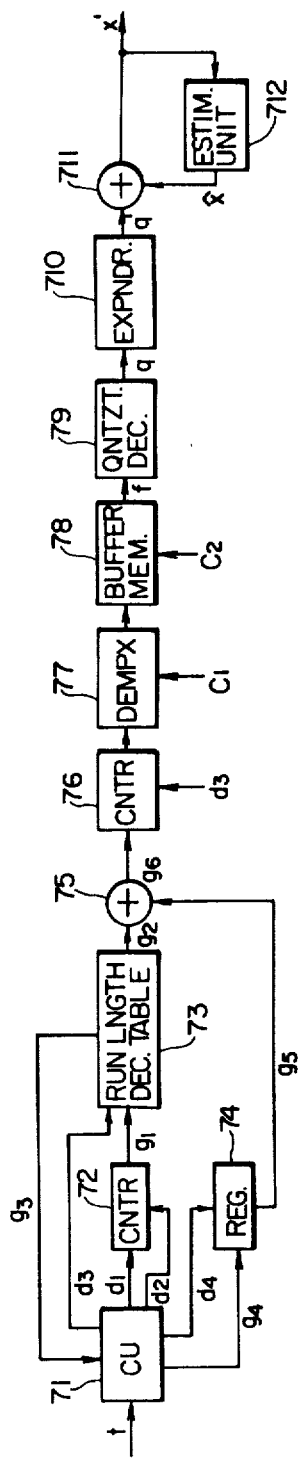
FIG. 6
FIG. 7

FIG. 8A

| TABLE ADDRESS | RUN LENGTH | RUN LENGTH CODE RL-W | | CODE LENGTH (BIT) |
|---|---|---|---|---|
| | | BLOCK CODE | TERMINATING CODE | |
| 0 | 1 | 0 | 0 | 3 |
| 1 | 2 | 0 | 01 | 3 |
| 2 | 3 | 0 | 10 | 3 |
| 3 | 4 | 0 | 11 | 3 |
| 4 | 5 ~ 8 | 10 | XX | 4 |
| 5 | 9 ~ 16 | 110 | XXX | 6 |
| 6 | 17 ~ 32 | 1110 | XXXX | 8 |
| 7 | 33 ~ 64 | 11110 | XXXXX | 10 |
| 8 | 65 ~ 128 | 111110 | XXXXXX | 12 |
| 9 | 129 ~ 256 | 1111110 | XXXXXXX | 14 |
| 10 | 257 ~ 512 | 11111110 | XXXXXXXX | 16 |
| 11 | 513 ~ 1024 | 111111110 | XXXXXXXXX | 18 |
| 12 | 1025 ~ 2048 | 1111111110 | XXXXXXXXXX | 20 |

FIG. 8B

| TABLE ADDRESS | RUN LENGTH | RUN LENGTH CODE RL-S | | CODE LENGTH (BIT) |
|---|---|---|---|---|
| | | BLOCK CODE | TERMINATING CODE | |
| 0 | 1 | 0 | | 1 |
| 1 | 2 | 10 | | 2 |
| 2 | 3 | 110 | | 3 |
| 3 | 4 | 1110 | | 4 |
| 4 | 5 ~ 8 | 11110 | XX | 7 |
| 5 | 9 ~ 16 | 111110 | XXX | 9 |
| 6 | 17 ~ 32 | 1111110 | XXXX | 11 |
| 7 | 33 ~ 64 | 11111110 | XXXXX | 13 |
| 8 | 65 ~ 128 | 111111110 | XXXXXX | 15 |
| 9 | 129 ~ 256 | 1111111110 | XXXXXXX | 17 |
| 10 | 257 ~ 512 | 11111111110 | XXXXXXXX | 19 |
| 11 | 513 ~ 1024 | 111111111110 | XXXXXXXXX | 21 |
| 12 | 1025 ~ 2048 | 1111111111110 | XXXXXXXXX | 23 |

FIG. 8C

| TABLE ADDRESS | RUN LENGTH | RUN LENGTH CODE RL-W OR RL-S | | CODE LENGTH (BIT) |
|---|---|---|---|---|
| | | BLOCK CODE | TERMINATING CODE | |
| 0 | 1 | 0 | 0 | 2 |
| 1 | 2 | 0 | 1 | 2 |
| 2 | 3 | 1 0 | 0 | 3 |
| 3 | 4 | 1 0 | 1 | 3 |
| 4 | 5 ~ 8 | 1 1 0 | X X | 5 |
| 5 | 9 ~ 16 | 1 1 1 0 | X X X | 7 |
| 6 | 17 ~ 32 | 1 1 1 1 0 | X X X X | 9 |
| 7 | 33 ~ 64 | 1 1 1 1 1 0 | X X X X X | 11 |
| 8 | 65 ~ 128 | 1 1 1 1 1 1 0 | X X X X X X | 13 |
| 9 | 129 ~ 256 | 1 1 1 1 1 1 1 0 | X X X X X X X | 15 |
| 10 | 257 ~ 512 | 1 1 1 1 1 1 1 1 0 | X X X X X X X X | 17 |
| 11 | 513 ~ 1024 | 1 1 1 1 1 1 1 1 1 0 | X X X X X X X X X | 19 |
| 12 | 1025 ~ 2048 | 1 1 1 1 1 1 1 1 1 1 0 | X X X X X X X X X X | 21 |

FIG. 9

| BIT POSITION OF QUANTIZATION CODE | RUN LENGTH CODING | |
|---|---|---|
| | RUN LENGTH CODE OF STATE "1" | RUN-LENGTH OF STATE "0" |
| 1 | RL—W | RL—S |
| 2 | RL—S | RL—W |
| 3 | RL—S | RL—W |
| 4 | RL—S | RL—W |

BAND COMPRESSION DEVICE FOR SHADED IMAGE

BACKGROUND OF THE INVENTION

The present invention relates to a shaded image coding system for efficiently transmitting or storing a shaded image. More particularly, the invention relates to a bandwidth compression device utilizing an estimation coding method and an entropy coding method.

A variety of coding compression systems have been proposed in the art which are intended to reduce the transmission time and the transmission cost in transmitting an image of variable density in a narrow bandwidth. One of the conventional systems is a DPCM (Differential Pulse Code Modulation). In accordance with that system, the picture element value for a present point is estimated from past picture element values and the estimation error, which is the difference between the estimation value and the picture element value of the present point, is quantized and coded thus achieving the desired bandwidth compression. In general, in such an estimation coding system, in order to improve the compression effect, nonlinear quantization is employed to make the quantization step intervals small when the estimation error is small and large when the estimation error is large by taking into account the visual characteristic that visual sensitivity is low for an image area where the density changes abruptly but is sufficiently high for an image area of fairly uniform density, and thus the number of quantization steps is made as small as possible.

However, if the number of quantization steps is made excessively small, the quantization error is increased as a result of which the system cannot sufficiently respond to abrupt variations in density of an input image thereby causing gradient overload noise in the reproduced image. Accordingly, it is necessary to determine the number of quantization steps and the quantization values to the extent that the degradation in quality of the reproduced image is not visually significant.

For coding the estimation error quantization values thus determined, in general, the entropy coding method is employed in order to further increase the compression effect. That is, coding is carried out by assigning a short code length to a quantization value of higher frequency and a long code length to a value of lower frequency. The entropy coding method is suitable for this purpose in that the distribution of estimation errors is similar to the Laplace distribution. Furthermore, linear quantization is generally considered suitable for the entropy coding.

As is apparent from the above description, in the bandwidth compression device according to the conventional estimation coding system, the number of quantization steps and the quantization values visually allowable are set and entropy coding is carried out with the data thus set to subject a shaded image to band compression.

In order to further improve the compression ratio, an adaptive type quantizer or estimating unit can be employed. However, in this case, such a device is intricate and yet the compression ratio is not greatly increased. Thus, with the use of the conventional method, the compression ratio is limited.

Accordingly, an object of the invention is to eliminate the above-described difficulties of the prior art bandwidth compression device. More specifically, an object of the invention is to provide a device in which the compression effect is much higher than that obtainable with the conventional device for the same number of quantization steps and quantization values.

SUMMARY OF THE INVENTION

In accordance with these and other objects, the invention provides a bandwidth compression device for a shaded image in which a sampled input picture element value and an estimation error obtained from the estimation value of the input picture element value are converted into quantization values and coded. At least one block of buffer memories is provided for temporarily storing first codes each having p bits according to a quantization step number in quantizing the estimation error. The estimation errors are converted into quantization values in correspondence to the input picture element values which are successively inputted, the quantization values are converted into the first codes, the quantization values are used for estimating the next input picture element value, and the first codes are successively stored in the buffer memories. When the first codes have been stored in the buffer memories, the first codes are read out therefrom in bit planes, and the first codes are converted into second codes for every bit plane. Furthermore, first codes suitable for the second coding are set. With the invention, the compression effect is made significantly higher than that of the prior art.

BRIEF DESCRIPTION OF THE DRAWINGS

FIG. 1 is a block diagram showing a bandwidth compression device constructed according to a conventional estimation coding system;

FIG. 2 is a block diagram showing a bandwidth expansion device according to the conventional estimation coding system;

FIG. 3A is a diagram showing an example of a table indicating quantization values with the various estimation error ranges;

FIG. 3B is a diagram showing an example of a table indicating first codes with quantization values;

FIG. 3C is a diagram showing another example of a table indicating first codes similarly as in FIG. 3B;

FIG. 4A is a diagram indicating estimation error generation probabilities in a shaded image employed in one embodiment of the invention;

FIG. 4B is a diagram showing an example of entropy codes in a conventional estimation coding system;

FIG. 4C is a diagram showing a table indicating state value generation probabilities at bit positions of the first codes with respect to the entire image in the case where the first codes in FIG. 3B are applied to the estimation error generation probabilities in FIG. 3A;

FIG. 6 is a block diagram showing an example of a bandwidth compression device according to the invention;

FIG. 7 is a block diagram showing an example of a bandwidth expansion device according to the invention;

FIGS. 8A–8C are diagrams showing example of run length codes which are employed in the preferred embodiment of the invention; and FIG. 9 is a diagram showing a table in which the run length codes in FIGS. 8A and 8B selected in the second coding are arranged in order.

DESCRIPTION OF THE PREFERRED EMBODIMENTS

Figure 5A:
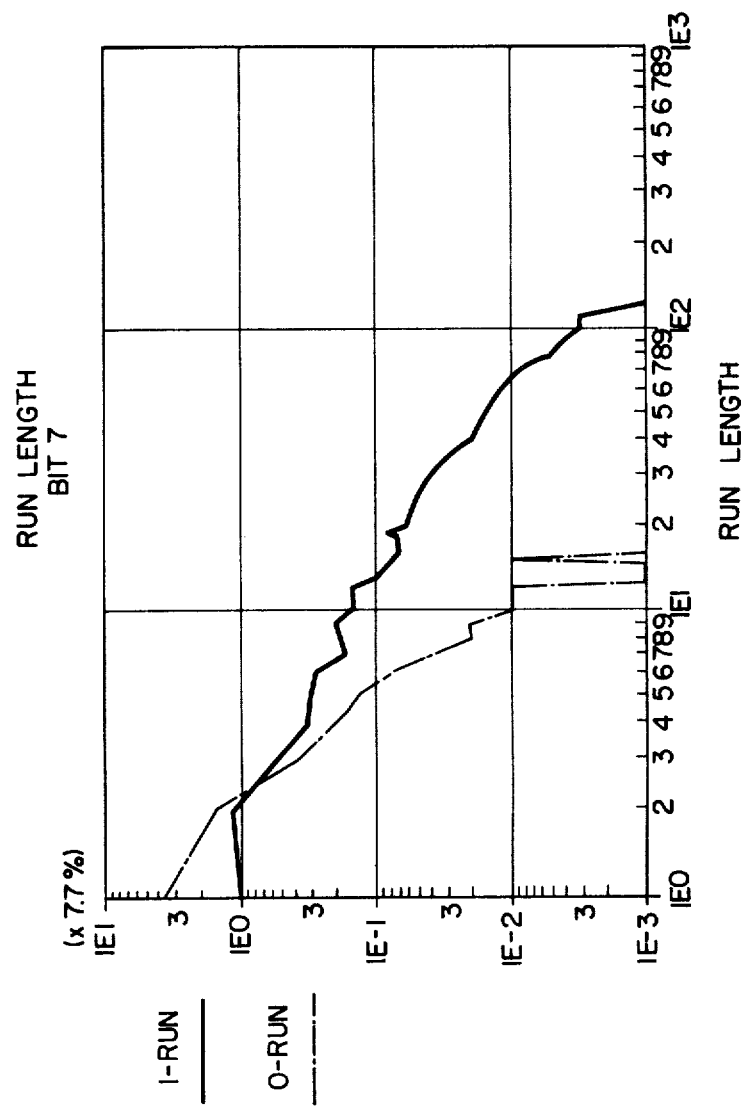
FIGS. 5A and 5B are graphical representations indicating the distributions of run lengths at the bit positions 1 and 2 of the first codes, respectively.

Preferred embodiments of the invention will be described with reference to the accompanying drawings.

FIGS. 1 and 2 are block diagrams showing conventional bandwidth compression and bandwidth expansion devices.

In FIG. 1, reference numeral 11 designates an image input unit such as a television camera or a scanner and 12 an A/D (analog-to-digital) converter. The sampled signal of an image of variable density which is obtained with the image input unit 11 and the A/D converter 12 is applied as an input picture element value x to a difference unit 13 successively. The difference unit 13 operates to calculate an estimation value e which is the difference between the input picture element value x of the present point and an estimation value x. A compression quantizer 14 operates to quantize the estimation error e according to the predetermined number of quantization steps and the quantization value in each step to output an quantization value q. The quantization value q is applied to an expander 15 where it is expanded so as to approach the value of the original estimation error e as a result of which an expansion value q' is outputted by the expander 15. The expander 15 operates to expand the quantization value q when the quantization value q has been compressed or to expand the present quantization value as much as a predetermined value when the past quantization value is equal to the present quantization, for instance, to reduce the quantization error. The expander 15 operates to prevent the degradation of a reproduced image due to gradient overload as quantization distortion which is caused by quantizing the estimation error as described above. However, the expander 15 may be omitted. In the case that the expander 15 is omitted in FIG. 1, an expander 23 in FIG. 2 should also be omitted.

The expansion value q' outputted by the expander 15 is added to the aforementioned estimation value $\hat{x}$ by an adder 16 as a result of which a picture element value x' is provided by the adder 16. The picture element value x' is close to the input picture element value x but with the value x' differing from the value x by the quantization error.

An estimating unit 17 estimates the next picture element value from a plurality of past picture element value x' to calculate the estimation value $\hat{x}$. The estimation equation is for instance a four-point estimation equation such as:

$$\hat{x} = a_1 x'_{m,n-1} + a_2 x'_{m-1,n-1} + a_3 x'_{m-1,n} + a_4 x'_{m-1,n+1}.$$

The quantization value q is encoded by an encoder 18 (code f) and is then transmitted through a transmitter 19.

The signal receiving side is arranged as shown in FIG. 2. The signal transmitted from the transmitter 19 is received by a receiver 21. The signal thus received has been encoded as described before. Therefore, the signal is decoded by a decoder 22 according to a procedure opposite to that effected by the encoder 18 as a result of which a quantization value q is obtained. The quantization value q thus obtained is applied to an expander 23 similar in arrangement to the above-described expander 15 as a result of which an expansion value q' is provided by the expander 23. The expansion value q' is applied to an adder 24 and there added to the estimation value $\hat{x}$ which was estimated from the past reproduction picture element as a result of which a reproduction picture element x' for the present point is outputted by the adder. An estimating unit 25 operates to output an estimation value $\hat{x}$ for the next reproduction picture element value using a plurality of past reproduction picture element values, for instance, according to the four-point estimation equation described above.

Further, the reproduction picture element value x' is applied through a D/A (digital-to-analog) converter 26 to an image outputting unit 27 such as a television monitor or a scanner printer to display a reproduced image.

The fundamental arrangement of the device according to the invention is similar to that of the above-described conventional system except for the provision of the encoder 18 and the decoder 22. A most significant feature of the invention, unlike the conventional system, is that, in coding the quantization value, the first code is set so as to be suitable for a second coding for each bit plane and the first codes are converted into second codes for each bit plane whereby the compression effect is much improved when compared with that of the conventional device.

The encoder 18 and the decoder 22 characterizing the invention will be described in detail. Hereinafter, the first code will be referred to as "a quantization code" in the sense of coding a quantization value. The second code is obtained by compression-coding a binary signal for each bit plane and therefore the facsimile bandwidth compression procedure can be utilized therefor without modification. However, in the embodiment described, it will be described with reference to a run length code.

FIGS. 3A–3c show an example of the conversion of the estimation error into the quantization value and the quantization code. More specifically, FIG. 3A shows quantization values q for estimation errors e in various ranges. FIG. 3B indicates quantization codes f corresponding respectively to the quantization values in FIG. 3A. As is apparent from FIGS. 3A and 3B, four quantization step numbers are assigned commonly to positive and negative estimation errors, and accordingly each quantization code is made up of four bits. In general, a larger one of the quantization step numbers assigned to the positive and negative estimation errors should be selected.

FIG. 3B indicates the bit states which are obtained by exploding the quantization codes in respective bit positions. The reason why the quantization codes f are defined as illustrated will become apparent from the bit states. That is, bit position 1 designates the positive or negative sign of an estimation error, bit position 2 the step number 2, bit position 3 the step number 3, and bit position 4 the step number 4. That is, the quantization codes are determined so that the bit position indicating the positive and negative signal of an estimation error and the bit positions indicating only the quantization step numbers are assigned. No particular bit position is provided for the quantization step number 1 which is considered to be most frequently used for the negative and positive estimation errors but this information can be determined from the state "0, 0, 0" of the bit positions 2, 3 and 4. Proper determination of the quantization codes decreases the code redundancy and is considerably suitable for run length coding as described below.

FIG. 3C illustrates another example of the quantization codes according to the invention. In this example, three-bit quantization codes are provided according to the quantization step numbers as a result of which the bit length is reduced. Accordingly, as is apparent from the figure, it may be seen that the run length coding efficiency for each bit plane is somewhat decreased when compared with the case of FIG. 3B. However, as the number of bit planes to be run-length-coded is reduced, the transmission efficiency is improved.

In embodying of either the quantization codes in FIG. 3B or 3C, the bit length of the quantization codes should be determined by taking the efficiency of the entire system into consideration. FIG. 3C indicates the case in which the quantization codes are determined so that the bit length of each quantization code is decreased and the quantization step numbers are assigned to the bit positions without degrading the run length coding efficiency for each bit plane.

The compression effect of the invention in which, as described above, the quantization values are converted into quantization codes which are divided into bit planes so that the quantization codes are further run-length-coded for each bit plane is higher than the compression effect of the conventional system. This can be more readily understood by a description referring to actual measurement data.

FIG. 4A indicates the estimation error measurement data of a shaded image used in the example. The measurement data points represent the probabilities of generation of the estimation errors provided when nonlinear quantization is carried out with the DPCM system shown in FIG. 1. In this case, the input picture element value x and the estimation error e are provided as 6 bits/picture-element (two bits of an 8 bits/picture-element being set to "0" for convenience in processing) and the estimation value $\hat{x}$, the expansion value q' and the picture element value x' are provided as 8 bits/picture element. Accordingly, for 8 bits/picture-element, the positive estimation error ranges can be represented by (0–4), (8–16), (20–36) and (40–) while the negative estimation error ranges can be represented by (−4−−8), (−12−−20), (−24−−40) and (−44−). In correspondence to this, the positive quantization values are 0, 12, 28 and 52 while the negative quantization values are −4, −16, −32 and −56. As is apparent from these measurement data, the estimation errors occur collectively in the vicinity of zero. Accordingly, in the conventional entropy coding system, a short code length is assigned to a quantization value which has a high estimation error occurrence frequency and a long code length is assigned to a quantization value which has a low estimation error occurrence frequency.

FIG. 4B illustrates an example of the conventional entropy coding. In this case, two coding examples are shown. The estimation error occurrence probability distributions vary greatly among different images. Therefore, it is difficult to determine which of the codes in examples (1) and (2) should be employed. However, if the codes of FIG. 4B are employed for the measurement data of FIG. 4A, then about 1.38 bits/picture-element is provided in the case of example (1) and about 1.44 bits/picture-element in the case of example (2). As is clear from the above description, if the conventional entropy coding is employed, the compression efficiency cannot be further improved no matter what code is used.

It will become more apparent from the following description tht the system of the invention, unlike the conventional entropy coding system, is particularly efficacious in that the coding is more effectively carried out to reduce the redundancy of the coding to thereby increase the compression effect.

FIG. 4C is a table of probabilities of generation of states "0" and "1" at the bit positions of quantization codes for the entire image in the case where the quantization codes shown in FIG. 4B are employed for the image measurement data indicated in FIG. 4A. As is apparent from this data, in each bit position the probability of generation of the states "0" and "1" are one-sided. This means that when the quantization codes for the entire image are divided into bit planes, the run length coding of each bit plane can be readily achieved. For instance, if entropy ($H = -\Sigma P \log_2 P$) is calculated simply for every bit plane, the sum of the calculation results is 1.075 bits/picture-element.

Figure 5B:
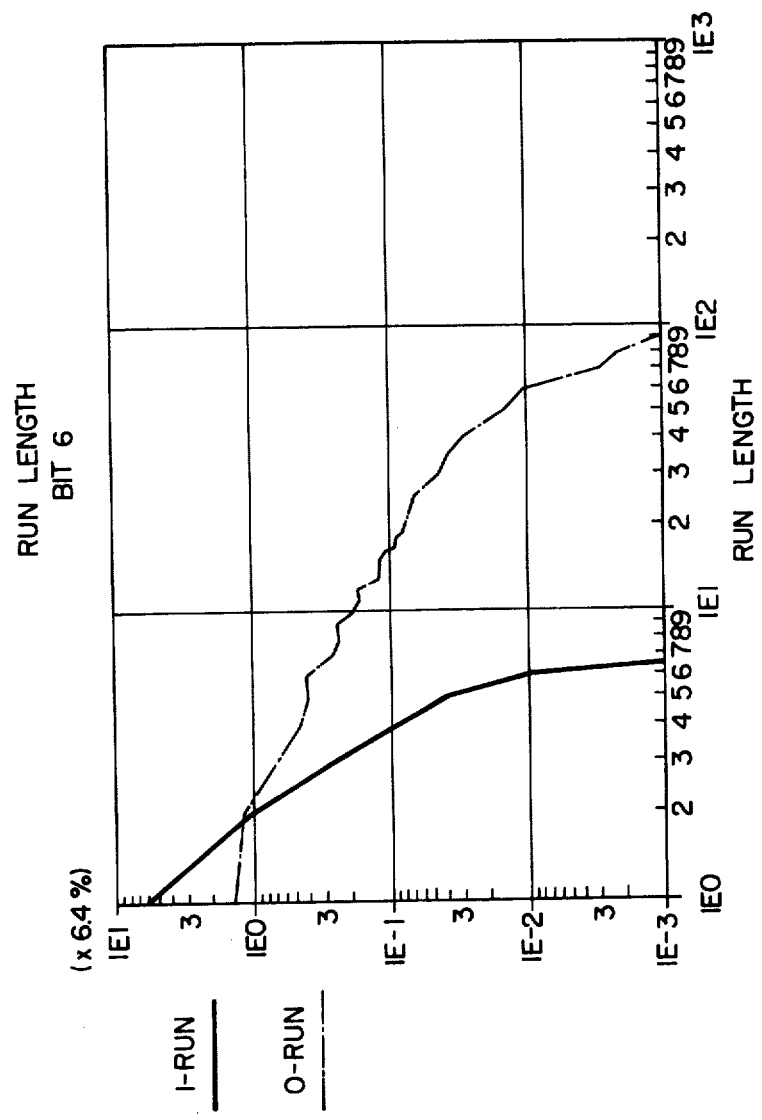

Let us consider the run length distribution of each bit plane of the quantization codes for the entire image. FIGS. 5A and 5B show the run length distribution of each bit plane of the quantization codes for the entire image in the case where the quantization codes of FIG. 3B are employed. More specifically, FIG. 5A shows the run length distribution of the plane of the bit position 1 of the quantization codes, and FIG. 5B shows the run length distribution of the plane of the bit position 2. In FIGS. 5A and 5B, the horizontal axis expresses the run lengths and the vertical axis the run length generation probabilities. Further in FIGS. 5A and 5B, the solid line indicates the "1" run distribution and the dotted line the "0" run distribution.

It is apparent from the relation of the distributions in FIGS. 5A and 5B to the data in FIG. 4C that, among the states "0" and "1" of the bit positions in FIG. 4C, the states of low generation probability are distributed collectively at the short run length side while the states of high generation probability are distributed collectively at the long run length side. This can be similarly applied to the planes of the other bit positions and to other different images. For the bit position 1 of the quantization code, the state "0" generation probability is significantly high, while for the other bit positions, the state "1" generation probability is significantly high. This statistical tendency can be utilized for run length coding. Accordingly, in accordance with the invention, two kinds of run length codes are provided. Specifically, a run length code RL-W is used for the state "1" of the bit position 1 of the quantization code and for the state "0" of the other bit positions, and a run length code RL-S is used for the state "0" of the bit position 1 and the state "1" of the other bit positions to thereby reduce the redundancy of coding. This is equivalent to the fact that, in a document facsimile, for instance, the modified Huffman code consists of independent codes suitable for the characteristics of white and black runs.

FIGS. 8A–8C show examples of the run length code employed in the invention. More specifically, FIG. 8A shows the Wyle code well known in the art, which is employed as the run length code RL-W. FIG. 8B shows a code which is obtained by modifying the Weyl code so as to assign a short code length collectively to the short run side. The modified Wyle code is employed as the run length code RL-S. FIG. 8C shows a different run length code which is provided according to the same concept as that utilized in FIG. 8B.

The number of bits per picture element will now be calculated in the case where, with respect to the image in this embodiment, the invention is practiced using the run length code in FIG. 8. In the case where the quantization codes on which the measurement data described with reference to FIG. 4 are provided are successively stored in the buffer memories with 512 picture elements in one scanning as one block, after the completion of one block, the buffer memories are divided into bit planes corresponding to the bit positions of the quantization code, and while the run length is counted for every bit plane, the run length coding is carried out, the average number of bits per picture element for the entire image is 1.13 bits/picture-element.

The run length codes are assigned according to the bit planes corresponding to the bit positions of the quantization code and the state "0" or "1" run lengths in the bit planes as shown in FIG. 9. That is, the above-described run length codes can be selected as arranged in FIG. 9. However, the selection of the run length codes may be unified in such a manner that the run length code RL-W is used for the state "0" of all the bit positions and the run length code RL-S for the state "1" thereby to eliminate the troublesome operation that the run length codes are selectively used according to the bit positions as in the case of FIG. 9. This can be achieved by using quantization codes which are obtained by inverting the bit states of the bit position 1 in FIG. 3B, for instance. That is, by using instead of the quantization codes (f) 9, 10, 12, 8, 0, 4, 2 and 1 indicated in FIG. 3B, 1, 2, 4, 0, 8, 12, 10 and 9, respectively.

Thus, the above-described 1.13 bits/picture-element is provided for the image through run length coding. The value is approximately equal to the entropy of 1.07 bits/picture-element in the case of FIG. 4C. It is apparent from this value that the bandwidth compression method of the invention has a much smaller redundancy and higher efficiency than the conventional band compression method.

The value 1.13 bits/picture-element is obtained when the above-described run length code is assigned simply to every block (or 512 picture elements in one scanning operation) of the image. However, if in the case where the same state is maintained throughout one block in each bit plane, instead of the above-described run length code, a special code of the order of one bit is given for every block termination, i.e. a skip code to one block is provided, then the redundancy can be further reduced.

By applying this method to an image in the preferred embodiment, about 0.05 bit/picture-element can be saved. That is, in the image, the blocks in which the same state is maintained in each bit plane (run length=512) occupy about 22% and 77% of the total number of blocks, or the total number of scanning lines, of the entire image with respect to the bit positions 3 and 4, respectively. The above-described value 1.13 bits/picture-element gives the run length codes (16 to 19 bits) corresponding to the run length of 512 to these blocks. Instead of this, the skip code of one bit is assigned to these blocks at the termination of every 512 picture element block as a result of which the redundancy in coding can be further reduced. Employing this method, the compression can be effected to about 1.08 bits/picture-element.

While the compression is about 1.38 to 1.44 bits/picture-element in the conventional entropy coding system, with the invention, the same image can be compressed to about 1.13 to 1.08 bits/picture element.

FIGS. 6 and 7 are block diagrams showing examples of circuits for practicing the above-described method according to the invention. More specifically, FIG. 6 shows an example of a bandwidth compression device according to the invention and FIG. 7 shows an example of a bandwidth expansion device according to the invention.

In the circuit shown in FIG. 6, a sampled input picture element value x at the present point and an estimation value $\hat{x}$ which is an estimate of the input picture element value at the present point determined from the past picture element values are subjected to subtraction by a subtractor 61 as a result of which an estimation error e ($=x-\hat{x}$) is outputted by the subtractor 61. In response to the magnitude of the estimation error e, a quantizer 62 outputs a quantization value q and a quantization code f according to predetermined quantization step numbers, quantization values and quantization codes. The quantization value q and the quantization code f can be converted according to the tables indicated in FIGS. 3A and 3B, for instance.

The quantization value q is expanded by an expander 63 to minimize the quantization distortion as a result of which an expansion value q' is outputted by the expander 63. The expander 63 operates in such a manner that, when the past quantitzation value such as $q_{m,n-1}$, or $q_{m-1,n}$ is equal to the present quantization value $q_{m,n}$, the present quantization value is expanded as much as a value which is predetermined for each quantization step so as to minimize the quantization error. Thus, the provision of the expander 63 prevents the lowering of the quality of an image due to gradient overload noise caused by the quantization distortion generated when the estimation error e is quantized. However, the expander 63 may be omitted. If the expander 63 is omitted, an expander 710 in FIG. 7 should also be omitted.

The expansion value q' is added to the aforementioned estimation value $\hat{x}$ by an adder 64 to provide a reproduction picture element value x' for estimating the next picture element. The reproduction picture element value x' differs from the input picture element value by the quantization error involved.

An estimating unit 65 operates to estimate the next input picture element value from a plurality of past reproduction picture element values x' to provide the estimation value $\hat{x}$. The estimation equation is, for instance, a four-point estimation equation such as:

$$\hat{x}_{m,n}=a_1 x'_{m,n-1}+a_2 x'_{m-1,n-1}+a_3 x'_{m-1,n}+a_4 x'_{m-1,n+1}.$$

For instance in the case where the input picture element value x has 6 bits/picture-element, it is preferable that the estimation error e have 6 bits/picture-element and each of the expansion value q', reproduction picture element value x' and estimation value $\hat{x}$ have 8 bits/picture-element because the accuracy is thereby improved and the estimation error of the next point is provided as a smaller value. In this case, for convenience in processing, it is preferable that each of the input picture element value x and estimation error e have 8 bits/picture-element with the first and second lowest bits thereof set to "0".

The quantization code f is temporarily stored in a buffer memory 66 successively in correspondence to the input picture element value x. The buffer member 66 has memory units corresponding to one block predetermined. The term "one block" is the unit which is so determined that, after a certain amount of quantization codes corresponding to input picture elements are stored, the quantization codes are run-length-coded for every bit plane for subsequent transmission. For instance, the one block may be the number of picture elements included in one scanning of an input image. Otherwise, the one block may be the number of picture elements in one frame of input image if the buffer memory is sufficiently large in capacity.

The buffer memory 66 stores the quantization codes f successively with the aid of address signals $S_1$ which are provided in synchronization with the input picture element values x which are successively inputted. The number of bits per picture element in the buffer memory 66 is equal to the number of bits assigned to the quantization code f. The number of bits per picture element assigned to the quantization code is determined in accordance with the number of quantization steps as described above.

When one block of the quantization codes f corresponding to the input picture element values x has been stored in the buffer memory 66, the inputting operation is suspended after which the run length coding is carried out.

The buffer memory 66 may be so modified that it stores two blocks A and B. In this case, when inputting of the quantization codes f to the block A has been completed, the block A is used for the run length coding while the following quantization codes f are inputted to the block B in succession. That is, if the inputting of the quantization codes f and the run length coding are carried out simultaneously by switching the blocks A and B, signal transmission can be carried out continuously. This technique should be employed in order to eliminate the lost time which may occur in operating the image inputting unit.

When one block of the quantization codes f has been inputted to the buffer memory 66, the quantization codes are outputted as a serial signal for every bit plane with the aid of a multiplexer 67. More specifically, with the aid of address signals $S_1$, the quantization codes f are read out of the buffer memory 66 and are inputted to the multiplexer 67 successively and the quantization codes of the bit plane which is specified by a bit plane selecting signal $S_2$ are outputted as a serial signal f'. A control unit 68 is so controlled that the serial signal f' is run-length-coded. That is, in the control unit 68, a serial signal f' is compared with the preceding serial signal which has been inputted thereto immediately before the firstly mentioned serial signal. When both are equal, the control unit 68 outputs a signal $C_1$, and when they are different, the control unit 68 outputs a signal $C_2$. A counter 69 counts the signal $C_1$ and applies a run length signal $r_1$ to a run length code table 610 which is counted when the signal $C_2$ is outputted. The counter 69 is reset by the signal $C_2$. Furthermore, the control unit 68 outputs a run length code selecting signal $C_3$ when it outputs the signal $C_2$.

The run length code selecting signal $C_3$ is used to select a run length code which is determined from the bit plane of the quantization code and its state "0" or "1". The run length code selection signal $C_3$ is outputted to select the run length codes in FIGS. 8A and 8B under the conditions indicated in FIG. 9. The aforementioned states "0" and "1" correspond to the present run length signal $r_1$.

With the aid of the run length signal $r_1$ and the run length selecting signal $C_3$, the run length code table 610 outputs a fixed-length run length code $r_2$ and a code length $r_3$.

When the run length code $r_2$ is applied to a register 612 and the code length $r_3$ is inputted to a counter 611, the control unit 68 outputs a clock signal $C_4$ synchronous with the transmission rate. With the aid of the clock signal $C_4$, the content of the shift register 612 is outputted as a transmission signal $r_4$ while being shifted bit by bit starting with the most significant bit. On the other hand, the content of the counter 611 is subjected to subtraction with the timing of the clock signal $C_4$. When the count value of the counter 611 reaches zero, the counter 611 outputs a signal $C_5$ which is applied to the control unit 68 whereupon the outputting of the clock signal $C_4$ is stopped and the control unit 68 becomes ready for the next run length coding. The run length is delivered as a run length code (the transmission signal $r_4$) of variable length. As far as the tables shown in FIGS. 8A and 8B are employed as the run length code table 610, it is unnecessary to provide as many tables as there are run lengths. A block code is determined by converting the run length signal $r_1$ into a table address (FIGS. 8A–8C). For table addresses 0 to 3, the content of the table is the run length signal $r_2$ without modification. For block addresses 4, 5, 6, . . . , the terminating code is determined as a value which is obtained by shifting the run length signal $r_1$ (eleven bits to express run lengths 0 to 2048) by (13–(table address)) towards the higher order bits. The least significant bit of the block code is set adjacent to the most significant bit of the terminating code and the block code and terminating code is shifted until the most significant bit is "1" as a result of which the run length signal $r_2$ is obtained. However, for table addresses 0 to 3, a value is employed which is obtained by shifting the content of the table towards the higher order bits.

When the variable-length run length coding in one bit plane has been completed in the above-described manner, the address signal $S_1$ specifies the first address in the buffer memory 66 and the bit plane selecting signal $S_2$ specifies the next bit plane so that run length coding of the bit plane thus specified is started.

In the band compression device as described above in which estimation encoding is carried out, a well known encoding circuit such as a "Wyle" encoding circuit can be employed as a run length encoding circuit instead of the stage after the multiplexer 67. More specifically, Wyle codes and a modification thereof which are shown in FIGS. 8A and 8B, respectively, are stored in the sum length code table 610 (IC memory, for instance), and a transmission signal $r_4$ is obtained by the encoding circuit in accordance with the stored values. The Wyle encoding circuit is described in detail in the article: H. Wyle, T. Erb, and R. Banow, "Reduced Time Facsimile Transmission by Digital Coding," IRE Trans., CS page 215 (Sept. 1961).

The input picture element values x are successively run-length-coded by the circuit of FIG. 6 as a result of which a bandwidth-compressed image is transmitted. The bandwidth-compressed image is subjected to bandwidth expansion in the circuit shown in FIG. 7 to reproduce the image.

In FIG. 7, a control unit 71 is so controlled that it receives the serial signals transmitted by the circuit in FIG. 6 and subjects them to run length decoding. In the case where the run length codes in FIG. 8 are employed, the one of the run length codes RL-W and RL-S being transmitted can be automatically detected depending on the bit plane of the quantization code which is specified by the run length to be run-length-coded at the present or whether the state of the preceding run length is "0" or "1" run. The control unit 71 carries out this detection to output a run length decoding selection signal $d_3$. Furthermore, the control unit 71 decides whether the state of a received signal t which is inputted bit by bit is "0" or "1". When the state of the received signal t is "1", the control unit 71 outputs a "1" signal $d_1$ which is counted by a counter 72. When the state of the received signal t is "0", the control unit 71 outputs a "0" signal $d_2$ which is also counted by the counter 72. The count value of the counter 72, i.e. a block signal $g_1$, is applied to a run length decoding table 73. The counter 72 is reset by the "0" signal $d_2$.

With the aid of the block signal $g_1$ and the run length decoding selection signal $d_3$, the run length range is determined with the run length decoding table 73 and a block run length $g_2$ (0, 5, 9, 17, . . . for instance as in FIG. 8A) is outputted by the run length decoding table 73.

At the same time, the run length decoding table 73 applies a code length signal $g_3$ for the corresponding terminating code to the control unit 71. The control unit 71 supplies a number of clock pulses $d_4$ synchronous with the received signal t as determined by the code length signal $g_3$ to a register 74 and applies the received signal t, as a terminating signal, by the number of clock pulses $d_4$. The register 74 receives the terminating signal $g_4$ while the content thereof is shifted with the timing of the clock pulses $d_4$.

The register 74 has a capacity of the same number of bits as the terminating codes, i.e. a capacity of 10 bits in the case of FIGS. 8A–8C. When the terminating signals $g_4$ are inputted to the register 74 by the number of terminating code's code length signals $g_3$, the content of the register is shifted by (10–(code length signal $g_3$)) towards the lower order bits while the higher order bits are changed to "0" so that a terminating run length $g_5$ is outputted by the shift register.

With an adder 75, the block run length $g_2$ is added to the terminating run length $g_5$ to provide a run length signal $g_6$ which is the reproduction of the run length signal $r_1$ in FIG. 6.

The run length signal $g_6$ is applied to a counter 76. The content of the counter 76 is decremented by one count at a time and the counter 76 outputs a decoding signal h at "0" or "1" continuously until the content reaches zero.

The state of the decoding signal h is automatically determined according to the above-described run length decoding selection signal $d_3$, i.e. the bit plane of the quantization code which is specified by the run length to be run-length-decoded at the present, or whether the state of the preceding run length is "0" run or "1" run. Thus, the state of the decoding signal h has a state "0" or "1" selected under these conditions.

The decoding signal h thus obtained is applied through a demultiplexer 77 to a buffer memory 78 where it is stored serially bit by bit. More specifically, the decoding signal h is applied through an output line of the demultiplexer 77, which is specified by the bit plane selecting signal $C_1$, to the buffer memory 78 and it is stored in a position in the buffer memory 78 which is specified by the address signal $C_2$.

When the decoding signal h is maintained stored until one cycle of addressing the buffer memory 8 has been accomplished, the bit plane selecting signal $C_1$ selects the next bit plane, the address signal $C_2$ specifies the first address in the buffer memory 78, and the decoding signals h are successively stored in the buffer memory 78 in correspondence to the received signals t (variable-length run length codes). This operation is continuously carried out until the quantization codes are arranged fully in one block of the buffer memory 78. The bit plane selecting signal $C_1$ is produced by the control unit 71.

When the quantization codes have been arranged fully in one block of the buffer memory 78 as described above, the quantization codes f are taken out of the buffer memory 78 picture element by picture element to perform bandwidth expansion.

Similarly as in FIG. 6, the buffer memory 78 may be so designed that it has two blocks, namely, blocks A and B, and when the quantization codes have been fully stored in the block A, the block A is used for bandwidth expansion and the succeeding decoding signals h are inputted to the block B. That is, if the inputting of the decoding signals h and the outputting of the quantization codes f are carried out simultaneously by switching the blocks A and B, then signal reception can be carried out continuously. This technique is preferred in order to eliminate the loss of time in the operation of the bandwidth expansion device as well as in the operation of the bandwidth compression device.

The quantization codes f of one block read out of the buffer memory 78 are successively inputted to a quantization decoder 79.

The quantization decoder 79 operates to convert the quantization codes f in FIG. 3B into the quantization values q in FIG. 3A. An expander 710, an adder 711 and an estimating unit 712 operate completely the same as in the expander 63, the adder 64 and the estimating unit 65 described with reference to FIG. 6 to output the reproduction picture element value x'. Instead of the run length codes in FIG. 8A or 8B, those in FIG. 8C may be employed as the case may be.

As is apparent from the above description, the system according to the invention of image inputting, estimation coding, coding for every bit plane, transmission, decoding for every bit plane, estimation decoding and image outputting remarkably improves the compression effect compared with the conventional estimation coding system.

In the case where the run length codes in FIG. 8 are employed for the image under the same conditions, the system of the invention, compared with the conventional estimation coding system, provides a compression effect of about 30 to 50% depending on the quantization method. For more intricate images, the system of the invention provides a compression effect of about 20 to 25%. For an extremely intricate image, the compression effect provided by the invention may not be so large as expected compared with that of the conventional estimation coding system. However, the compression effect of the invention for ordinary image is sufficiently high.

An embodiment of the invention has been described in which run length codes are used for the second coding. As the second coding is carried out for every bit plane, a bandwidth compression technique using binary signals, such as one-dimensional coding (Modified Huffman) or two-dimensional coding (Modified READ) which has been employed as a standard in a standard in a facsimile, can be utilized without modification.

What is claimed is:

1. A band compression method for a shaded image in which a sampled input picture element value and an estimation error obtained from an estimation value of said input picture element value are converted into quantization values and coded, comprising the steps of:
   (a) determining a difference between an input picture element value and a present estimate of said input picture element value;
   (b) converting said estimation error into a quantization value in correspondence to said input picture element;
   (c) converting said quantization value into a quantization code corresponding to said estimation error and quantization value;
   (d) estimating the next input picture element value with said quantization value;
   (e) storing said quantization code in a buffer memory;
   (f) when a block of a predetermined number of said quantization codes has been stored in said buffer memory, reading out said quantization codes from said buffer memory in bit planes, each of said bit planes consisting of like-ordered bits of said quantization codes;
   (g) converting the data contained in each of said bit planes into run-length codes by run-length encoding said data contained in each of said bit planes;
   (h) transmitting said run-length codes to a receiving station; and
   (i) converting receiving run-length codes to a visual image at said receiving station.

2. The method as claimed in claim 1 in which said step (c) of converting said quantization value into said quantization code comprises providing for said quantization code a first bit indicative of the polarity of a respective estimation error and other bits relating only to a quantization step number irrespective of the positive and negative values of said estimation error.

3. The method as claimed in claim 2 in which, in assigning said other bits to the bit positions corresponding only to said quantization step numbers, a most significant one of said other bits is not assigned to quantization step numbers corresponding to quantization values highest in generation frequency among the quantization values of the positive and negative values of said estimation errors.

4. The method as claimed in claim 1 wherein said step (g) of run-length encoding comprises run-length encoding runs of "0"s and "1"s with different codes.

5. The method as claimed in claim 1 or 4 wherein said step (g) of run-length encoding comprises providing a skip code for runs in which all bits are in the same state.

6. A band compression method for a shaded image, comprising the steps of:
   repetitively obtaining an estimation error from a sampled input picture element value and forming from a estimation value thereof a quantization code having a predetermined integer first number of bits;
   temporarily storing said quantization codes in at least one block of buffer memories having a number of bit planes equal to said number of bits in each of said quantization codes, wherein like-ordered bits of said quantization code stored in said block of memories are stored in same ones of said bit planes;
   when a predetermined second number of said quantization codes has been stored in the bit planes of said buffer memories, successively reading out said quantization codes from said buffer memories in an order of said bit planes;
   converting data of each of said bit planes into run-length codes;
   transmitting said run-length codes to a receiving station; and
   converting received run-length codes to a visual image at said receiving station.

* * * * *